United States Patent
Onohara et al.

(10) Patent No.: US 11,977,157 B2
(45) Date of Patent: May 7, 2024

(54) OPTICAL DISTANCE MEASUREMENT DEVICE AND MACHINING DEVICE

(71) Applicant: MITSUBISHI ELECTRIC CORPORATION, Tokyo (JP)

(72) Inventors: Kiyoshi Onohara, Tokyo (JP); Hiroki Goto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 886 days.

(21) Appl. No.: 17/038,647

(22) Filed: Sep. 30, 2020

(65) Prior Publication Data
US 2021/0011157 A1    Jan. 14, 2021

Related U.S. Application Data

(63) Continuation of application No. PCT/JP2018/022444, filed on Jun. 12, 2018.

(51) Int. Cl.
*G01S 17/32*    (2020.01)
*G01B 11/14*    (2006.01)
(Continued)

(52) U.S. Cl.
CPC .............. *G01S 17/32* (2013.01); *G01B 11/14* (2013.01); *G01S 7/497* (2013.01); *G01S 7/499* (2013.01)

(58) Field of Classification Search
CPC .......... G01S 17/32; G01S 7/497; G01S 7/499; G01B 11/14
See application file for complete search history.

(56) References Cited

U.S. PATENT DOCUMENTS 7,139,446 B2 * 11/2006 Slotwinski .............. G01S 7/499
73/514.27
8,934,789 B2 * 1/2015 Sugitani ............... H04B 10/616
398/208
(Continued)

FOREIGN PATENT DOCUMENTS

DE    10 2015 004 272 A1    10/2016
EP       1 853 952 B1     4/2013
(Continued)

OTHER PUBLICATIONS

German Office Action for German Application No. 11 2018 007 552.4 dated Jun. 7, 2021, with English translation.
(Continued)

*Primary Examiner* — Isam A Alsomiri
*Assistant Examiner* — Joseph C Fritchman
(74) *Attorney, Agent, or Firm* — Birch, Stewart, Kolasch & Birch, LLP

(57) ABSTRACT

The optical distance measurement device is configured to include an optical interference unit for separating the reflected light into a reflected light of a first polarized wave and a reflected light of a second polarized wave, extracting first and second components orthogonal to each other from an interference light of the reflected light of the first polarized wave and the reference light, and extracting third and fourth components orthogonal to each other from an interference light of the reflected light of the second polarized wave and the reference light, and a polarization rotation unit for acquiring one or more components of horizontal and vertical components of a polarized wave by rotating a polarization angle of a first complex signal having the first and second components and a polarization angle of a second complex signal having the third and fourth components, so that a distance calculation unit calculates, on the basis of the components acquired by the polarization rotation unit, a
(Continued)

difference between a frequency of the reflected light and a frequency of the reference light, and calculates a distance to a measurement target from the difference.

6 Claims, 8 Drawing Sheets

(51) Int. Cl.
  *G01S 7/497* (2006.01)
  *G01S 7/499* (2006.01)

(56) References Cited

U.S. PATENT DOCUMENTS

| | | | |
|---|---|---|---|
| 9,020,367 B2 * | 4/2015 | Jones | H04L 27/223 |
| | | | 398/208 |
| 9,461,754 B2 * | 10/2016 | Sonoda | H04B 10/614 |
| 9,464,883 B2 * | 10/2016 | Swanson | G01B 9/02091 |
| 2011/0051118 A1 | 3/2011 | Sato et al. | |
| 2012/0082464 A1 * | 4/2012 | Yasuda | H04B 10/6166 |
| | | | 398/152 |
| 2015/0012244 A1 | 1/2015 | Oki | |
| 2016/0291135 A1 | 10/2016 | Ando et al. | |
| 2017/0146335 A1 | 5/2017 | Martinez et al. | |
| 2018/0100924 A1 | 4/2018 | Brinkmeyer | |
| 2018/0224547 A1 * | 8/2018 | Crouch | G01S 7/487 |
| 2018/0224548 A1 | 8/2018 | Hariyama et al. | |

FOREIGN PATENT DOCUMENTS

| | | |
|---|---|---|
| EP | 3 182 152 A1 | 6/2017 |
| JP | 56-81467 A | 7/1981 |
| JP | 7-95097 B2 | 10/1995 |
| JP | 2011-185837 A | 9/2011 |
| JP | 2015-178981 A | 10/2015 |
| JP | 2017-523403 A | 8/2017 |
| WO | WO 2010/100846 A1 | 9/2010 |
| WO | WO 2013/129387 A1 | 9/2013 |
| WO | WO 2015/087842 A1 | 6/2015 |
| WO | WO 2017/187510 A1 | 4/2018 |

OTHER PUBLICATIONS

Japanese Office Action for application No. 2020-524987 dated Aug. 4, 2020.
Indian Office Action dated Dec. 3, 2021 for Application No. 202047045353 with an English translation.

* cited by examiner

OPTICAL DISTANCE MEASUREMENT DEVICE AND MACHINING DEVICE

CROSS REFERENCE TO RELATED APPLICATIONS

This application is a Continuation of PCT International Application No. PCT/JP2018/022444, filed on Jun. 12, 2018, which is hereby expressly incorporated by reference into the present application.

TECHNICAL FIELD

The present invention relates to an optical distance measurement device that calculates a distance to a measurement target and a machining device that includes the optical distance measurement device.

BACKGROUND ART

The following Patent Literature 1 discloses a foreign matter detecting device capable of detecting a three-dimensional shape of a search target.

The foreign matter detecting device disclosed in Patent Literature 1 below includes optical output means that outputs a laser beam, and scanning means that scans a search area of a search target using the laser beam.

Further, the foreign matter detecting device includes polarization separation means for separating scattered light from the search target for each polarization component when irradiating the search target with the laser beam, and first and second light receiving means for receiving each polarization component of the scattered light.

Further, the foreign matter detecting device includes first and second phase difference detecting means for detecting the phase differences between the laser light and each polarization component of the scattered light, and detecting the reception intensities of respective polarization components of the scattered light.

Further, the foreign matter detecting device includes signal processing means for calculating a depolarization rate of the scattered light on the basis of the detection result, calculating a separation distance from the foreign matter in accordance with the calculation result of the depolarization rate, and outputting the shape of the foreign matter.

Therefore, the foreign matter detecting device can detect the three-dimensional shape of the foreign matter regardless of the polarization component of the return light.

CITATION LIST

Patent Literature

Patent Literature 1: JP 2011-185837 A

SUMMARY OF INVENTION

Technical Problem

In the foreign matter detecting device disclosed in Patent Literature 1, when a laser beam is irradiated, if a polarization plane of light is rotated, a reception intensity of each polarization component of scattered light scattered by the search target may be reduced.

The foreign matter detecting device has a problem that if the reception intensity of each polarization component of scattered light is reduced, the measurement accuracy of the distance to the search target deteriorates.

The present invention has been made to solve the above problem, and an object of the present invention is to provide an optical distance measurement device and a machining device capable of measuring a distance to a measurement target even when a polarization plane of light is rotated.

Solution to Problem

The optical distance measurement device according to the present invention includes: an optical output generator to output frequency-swept light whose frequency changes with lapse of time as reference light, to multiplex polarized waves of the frequency-swept light, and to output the frequency-swept light of first and second polarized waves orthogonal to each other; an optical receiver-transmitter to irradiate the frequency-swept light of first and second polarized waves toward a measurement target, and to receive frequency-swept light reflected by the measurement target as reflected light; an optical interferometer to separate the reflected light into a reflected light of a first polarized wave and a reflected light of a second polarized wave, to extract first and second components orthogonal to each other from an interference light of the reflected light of the first polarized wave and the reference light, and to extract third and fourth components orthogonal to each other from an interference light of the reflected light of the second polarized wave and the reference light; and processing circuitry acquire one or more components of horizontal and vertical components of a polarized wave by rotating a polarization angle of a first complex signal having the first and second components and a polarization angle of a second complex signal having the third and fourth components; and to calculate, on the basis of the acquired components, a difference between a frequency of the reflected light and a frequency of the reference light, and to calculate a distance to the measurement target from the difference.

Advantageous Effects of Invention

According to this invention, the optical distance measurement device is configured to include an optical interferometer to separate the reflected light into a reflected light of a first polarized wave and a reflected light of a second polarized wave, to extract first and second components orthogonal to each other from an interference light of the reflected light of the first polarized wave and the reference light, and to extract third and fourth components orthogonal to each other from an interference light of the reflected light of the second polarized wave and the reference light, and processing circuitry to acquire one or more components of horizontal and vertical components of a polarized wave by rotating a polarization angle of a first complex signal having the first and second components and a polarization angle of a second complex signal having the third and fourth components, so that the processing circuitry calculates, on the basis of the acquired components, a difference between a frequency of the reflected light and a frequency of the reference light, and calculates a distance to the measurement target from the difference. Therefore, the optical distance measurement device according to the present invention can measure the distance to the measurement target even when the polarization plane of light is rotated.

DESCRIPTION OF EMBODIMENTS

Hereinafter, in order to explain this invention in more detail, a mode for carrying out this invention will be described with reference to the accompanying drawings.

First Embodiment

Figure 1:
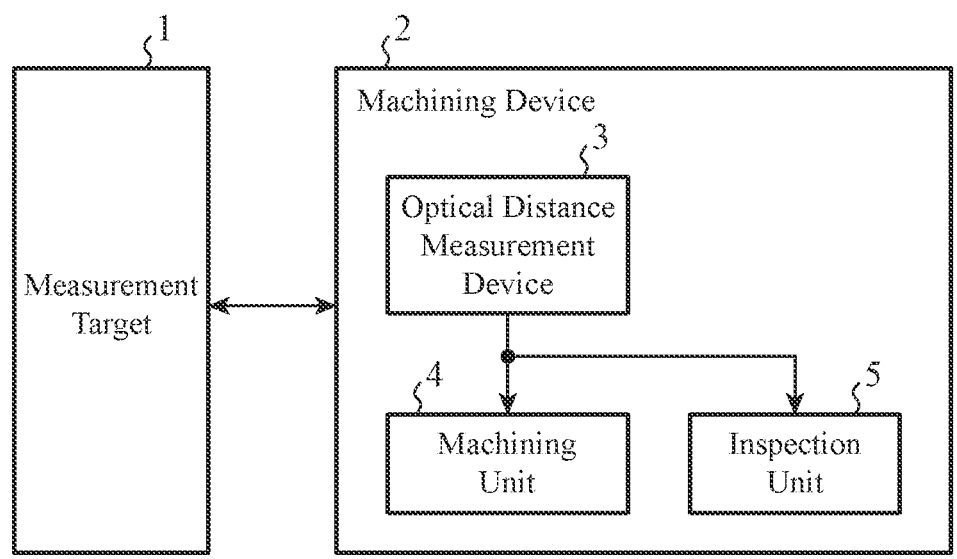
FIG. 1 is a configuration diagram showing a machining device 2 according to a first embodiment.

FIG. 1 is a configuration diagram showing a machining device 2 according to the first embodiment.

In FIG. 1, a measurement target 1 corresponds to a workpiece to be machined by the machining device 2.

The machining device 2 includes an optical distance measurement device 3, a machining unit 4, and an inspection unit 5.

The optical distance measurement device 3 is a device that measures the distance to the measurement target 1 and outputs the measured distance to each of the machining unit 4 and the inspection unit 5.

The machining unit 4 machines the measurement target 1 on the basis of the distance output from the optical distance measurement device 3.

As a machining example of the machining unit 4, machining of polishing the measurement target 1 or machining of cutting the measurement target 1 so that the distance output from the optical distance measurement device 3 matches the design value can be considered.

The inspection unit 5 inspects the surface roughness of the measurement target 1 or the unevenness of the measurement target 1 on the basis of the distance output from the optical distance measurement device 3.

As an example of the inspection of the inspection unit 5, an inspection for determining whether or not the distance output from the optical distance measurement device 3 matches the design value can be considered.

Figure 2:
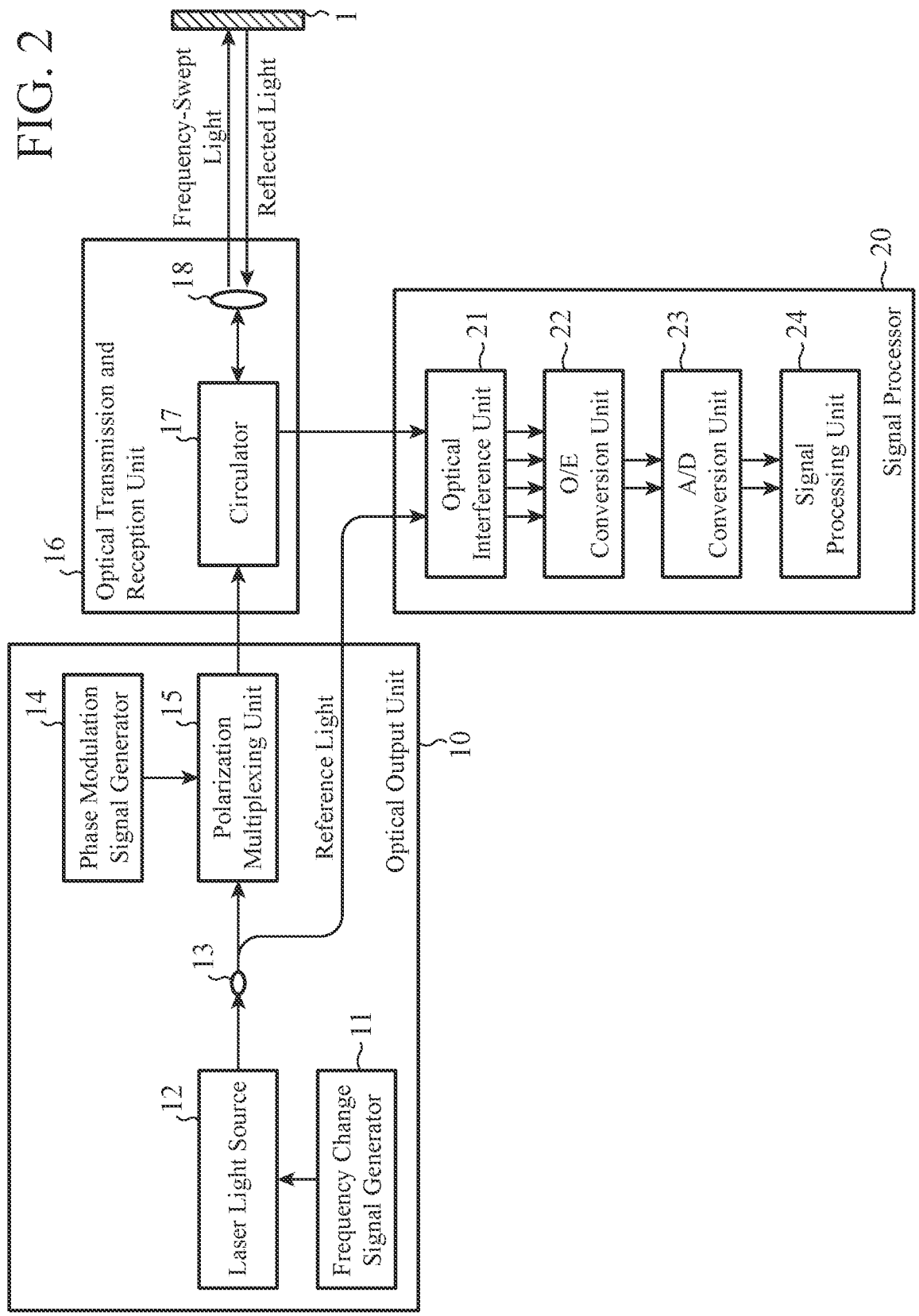
FIG. 2 is a configuration diagram showing an optical distance measurement device 3 according to the first embodiment.

FIG. 2 is a configuration diagram showing the optical distance measurement device 3 according to the first embodiment.

In FIG. 2, an optical output unit 10 includes a frequency change signal generator 11, a laser light source 12, an optical coupler 13, a phase modulation signal generator 14, and a polarization multiplexing unit 15.

The optical output unit 10 outputs a frequency-swept light of a first polarized wave whose frequency changes with lapse of time as reference light to a signal processor 20.

The optical output unit 10 multiplexes the polarized waves of the frequency-swept light, and outputs the frequency-swept light of the first and second polarized waves which are orthogonal to each other to the optical transmission and reception unit 16.

In the optical distance measurement device 3 of the first embodiment, it is assumed that the first polarized wave is a horizontally polarized wave and the second polarized wave is a vertically polarized wave.

However, this is merely an example, and for example, the first polarized wave may be a vertically polarized wave and the second polarized wave may be a horizontally polarized wave.

The frequency change signal generator 11 outputs, to the laser light source 12, a frequency change signal whose frequency changes with lapse of time.

The frequency change signal output from the frequency change signal generator 11 may be a sawtooth wave signal, a triangular wave signal, or the like. In the optical distance measurement device 3 of the first embodiment, it is assumed that the frequency change signal generator 11 outputs a sawtooth wave signal as the frequency change signal.

The laser light source 12 is implemented by, for example, a distributed feedback laser. The laser light source 12 is connected to the optical coupler 13 via an optical fiber.

The laser light source 12 repeatedly outputs, to the optical coupler 13, frequency-swept light of a horizontally polarized wave whose frequency changes with lapse of time on the basis of the sawtooth wave signal output from the frequency change signal generator 11.

The optical coupler 13 is connected to the polarization multiplexing unit 15 via an optical fiber, and is also connected to the optical interference unit 21 via an optical fiber.

The optical coupler 13 splits the frequency-swept light of a horizontally polarized wave output from the laser light source 12 into two lights, outputs one frequency-swept light after branching to the polarization multiplexing unit 15, and outputs the other frequency-swept light after branching to the optical interference unit 21 as reference light.

The phase modulation signal generator 14 generates a phase modulation signal for phase-shift-keying the frequency-swept light, and outputs the phase modulation signal to the polarization multiplexing unit 15.

The polarization multiplexing unit 15 is connected to a circulator 17 via an optical fiber.

The polarization multiplexing unit 15 generates frequency-swept light of a vertically polarized wave from the frequency-swept light of the horizontally polarized wave output from the optical coupler 13, and multiplexes the frequency-swept light of the horizontally polarized wave and the frequency-swept light of the vertically polarized wave.

The polarization multiplexing unit 15 phase-shift-keys the frequency-swept light after polarization multiplexing according to the phase modulation signal output from the phase modulation signal generator 14, and outputs the frequency-swept light after the phase shift keying to the circulator 17.

The phase shift keying may be QPSK (Quadrature Phase Shift Keying) or BPSK (Binary Phase Shift Keying), but in the optical distance measurement device 3 of the first embodiment, the phase shift keying is assumed to be QPSK.

The polarization multiplexing unit 15, when phase-shift-keying the frequency-swept light by QPSK, repeatedly outputs four phase states mapped to a binary signal of, for example, "00", "01", "10", "11", as the frequency-swept light after the phase shift keying to the circulator 17.

The optical transmission and reception unit 16 includes a circulator 17 and a lens 18.

The optical transmission and reception unit 16 irradiates the measurement target 1 with the frequency-swept light output from the polarization multiplexing unit 15, and receives the frequency-swept light reflected by the measurement target 1 as reflected light.

The circulator 17 is connected to the optical interference unit 21 via an optical fiber.

The circulator 17 outputs the frequency-swept light output from the polarization multiplexing unit 15 to the lens 18, and outputs the reflected light output from the lens 18 to the optical interference unit 21.

The lens 18 emits the frequency-swept light output from the circulator 17 toward the measurement target 1 in the space.

The lens 18 collects the frequency-swept light reflected by the measurement target 1 as reflected light, and outputs the reflected light to the circulator 17.

The signal processor 20 includes the optical interference unit 21, an opto-electric conversion unit (hereinafter, referred to as "O/E conversion unit") 22, an analog-digital conversion unit (hereinafter, referred to as "A/D conversion unit") 23, and the signal processing unit 24.

The optical interference unit 21 is connected to the O/E conversion unit 22 via an optical fiber.

The optical interference unit 21 separates the reflected light output from the circulator 17 into reflected light of a first polarized wave and reflected light of a second polarized wave.

The optical interference unit 21 extracts a first component $P_{H,I}$ and a second component $P_{H,Q}$ from an interference light of the reflected light of the first polarized wave and the reference light, and extracts a third component $P_{V,I}$ and a fourth component $P_{V,Q}$ from an interference light of the reflected light of the second polarized wave and the reference light.

The first component $P_{H,I}$ and the second component $P_{H,Q}$ are components orthogonal to each other, and if the angle of the first component $P_{H,I}$ is θ, the angle of the second component $P_{H,Q}$ is θ+90°.

The third component $P_{V,I}$ and the fourth component $P_{V,Q}$ are components orthogonal to each other, and if the angle of the third component $P_{V,I}$ is a, the angle of the fourth component $P_{V,Q}$ is α+90°.

For example, the first component $P_{H,I}$ corresponds to the horizontal component whose phase included in the horizontally polarized wave is 0°, and the second component $P_{H,Q}$ corresponds to the vertical component whose phase included in the horizontally polarized wave is 90°. However, when the frequency-swept light emitted from the lens 18 is reflected by the measurement target 1, if the polarization plane is rotated, the first component $P_{H,I}$ does not match the horizontal component having a phase of 0°, and the horizontal component and the vertical component are mixed. In addition, the second component $P_{H,Q}$ does not match the vertical component having a phase of 90°, and the horizontal component and the vertical component are mixed.

The third component $P_{V,I}$ and the fourth component $P_{V,Q}$ included in the vertically polarized wave are the same as the first component $P_{H,I}$ and the second component $P_{H,Q}$.

The optical interference unit 21 outputs each of the first component $P_{H,I}$, the second component $P_{H,Q}$, the third component $P_{V,I}$, and the fourth component $P_{V,Q}$ to the O/E conversion unit 22.

The O/E conversion unit 22 converts each of the first component $P_{H,I}$, the second component $P_{H,Q}$, the third component $P_{V,I}$, and the fourth component $P_{V,Q}$ output from the optical interference unit 21 to an electric signal.

The O/E conversion unit 22 outputs each of a first component $P'_{H,I}$, a second component $P'_{H,Q}$, a third component and a fourth component $P'_{V,Q}$, which are electric signals, to the A/D conversion unit 23.

The A/D conversion unit 23 converts each of the first component $P''_{H,I}$, the second component $P'_{H,Q}$, the third component $P'_{V,I}$ and the fourth component $P'_{V,Q}$, which are output from the O/E conversion unit 22, from an analog signal to a digital signal.

The A/D conversion unit 23 outputs each of a first component $P''_{H,I}$, a second component $P''_{H,Q}$, a third component $P''_{V,I}$ and a fourth component $P''_{V,Q}$, which are digital signals, to the polarization rotation unit 25 of the signal processing unit 24.

Figure 3:
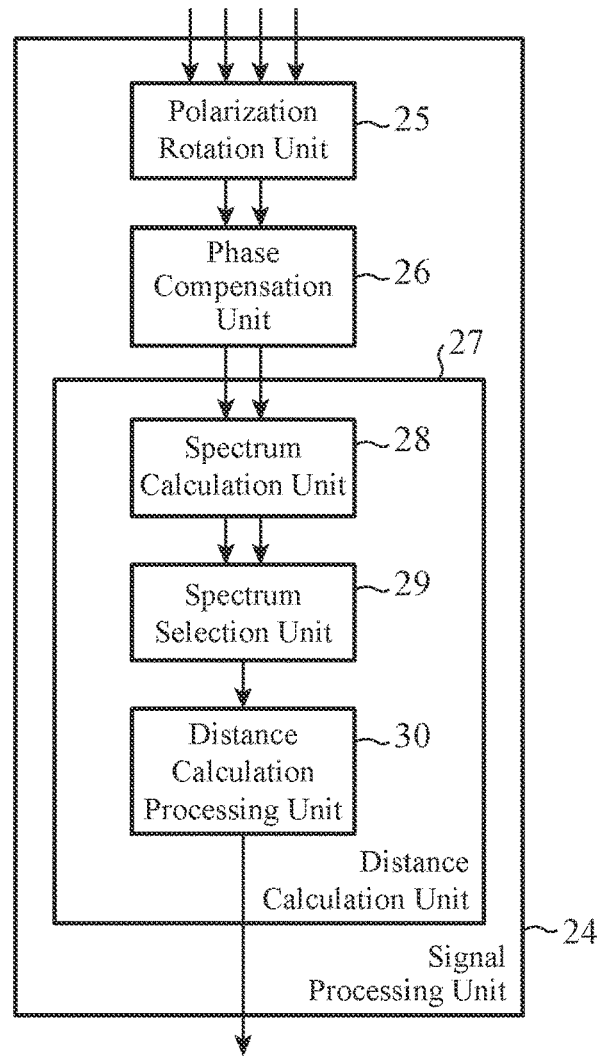
FIG. 3 is a configuration diagram showing a signal processing unit 24 of the optical distance measurement device 3 according to the first embodiment.

As shown in FIG. 3, the signal processing unit 24 includes a polarization rotation unit 25, a phase compensation unit 26, and a distance calculation unit 27.

FIG. 3 is a configuration diagram showing the signal processing unit 24 of the optical distance measurement device 3 according to the first embodiment.

Figure 4:
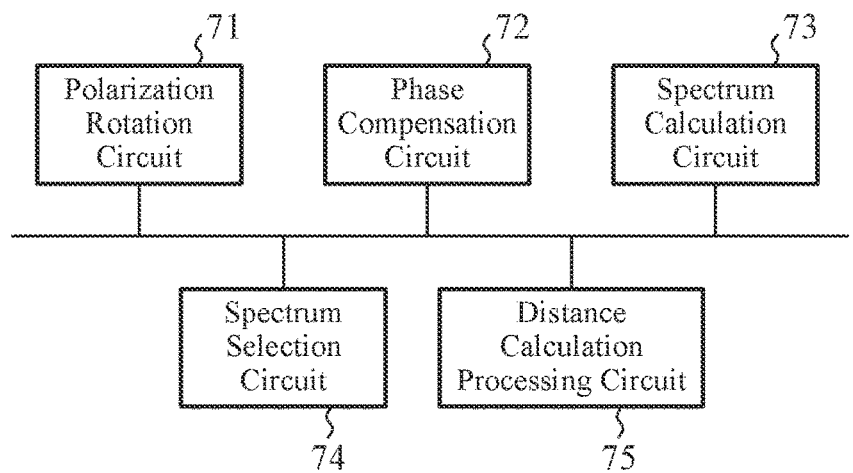
FIG. 4 is a hardware configuration diagram showing hardware of the signal processing unit 24.

FIG. 4 is a hardware configuration diagram showing hardware of the signal processing unit 24.

In FIG. 3, the polarization rotation unit 25 is implemented by, for example, a polarization rotation circuit 71 shown in FIG. 4.

The polarization rotation unit 25 constructs a complex signal $e_H$ (first complex signal) from the first component $P''_{H,I}$ and the second component $P''_{H,Q}$ output from the A/D conversion unit 23.

Further, the polarization rotation unit 25 constructs a complex signal $e_V$ (second complex signal) from the third component $P''_{V,I}$ and the fourth component $P''_{V,Q}$ output from the A/D conversion unit 23.

The polarization rotation unit 25 rotates the polarization angle of the complex signal $e_H$ and the polarization angle of the complex signal $e_V$ to acquire each of the horizontal component $P_H$ and the vertical component $P_V$, and outputs each of the horizontal component $P_H$ and the vertical component $P_V$ to the phase compensation unit 26.

The phase compensation unit 26 is implemented by, for example, a phase compensation circuit 72 shown in FIG. 4.

The phase compensation unit 26 constructs a complex signal $e_{H,V}$ from the horizontal component $P_H$ and the vertical component $P_V$ output from the polarization rotation unit 25.

The phase compensation unit 26 performs phase compensation processing of removing the phase of a noise component contained in the phase of the complex signal $e_{H,V}$, and outputs one or more components of the horizontal component $P'_H$ and the vertical component $P'_V$ in the complex signal after the phase compensation processing to the distance calculation unit 27.

The distance calculation unit 27 includes a spectrum calculation unit 28, a spectrum selection unit 29, and a distance calculation processing unit 30.

The distance calculation unit 27, on the basis of one or more components of the horizontal component $P'_H$ after the phase compensation processing and the vertical component $P'_V$ after the phase compensation processing, calculates a difference Δf between the frequency of the reflected light and the frequency of the reference light, and performs processing of calculating the distance to the measurement target 1 from the difference Δf.

The spectrum calculation unit 28 is implemented by, for example, a spectrum calculation circuit 73 shown in FIG. 4.

The spectrum calculation unit 28 performs processing of calculating a frequency spectrum $fs_H$ of the horizontal component $P'_H$ by Fourier-transforming the horizontal component $P'_H$ output from the phase compensation unit 26.

Further, the spectrum calculation unit 28 performs processing of calculating a frequency spectrum $fs_V$ of the vertical component $P'_V$ by Fourier-transforming the vertical component $P'_V$ output from the phase compensation unit 26.

The spectrum calculation unit 28 outputs each of the frequency spectrum $fs_H$ of the horizontal component $P'_H$ and the frequency spectrum $fs_V$ of the vertical component $P'_V$ to the spectrum selection unit 29.

Here, the spectrum calculation unit 28 calculates both the frequency spectrum $fs_H$ and the frequency spectrum $fs_V$, but may calculate one of the frequency spectrum $fs_H$ and the frequency spectrum $fs_V$.

When the spectrum calculation unit 28 calculates one of the frequency spectrum $fs_H$ and the frequency spectrum $fs_V$, the spectrum selection unit 29 in the subsequent stage is unnecessary. The spectrum calculation unit 28, when calculating one of the frequency spectrum $fs_H$ and the frequency spectrum $fs_V$, outputs the calculated frequency spectrum to the distance calculation processing unit 30.

The spectrum selection unit 29 is implemented by, for example, a spectrum selection circuit 74 shown in FIG. 4.

The spectrum selection unit 29 selects one of the frequency spectrum $fs_H$ and the frequency spectrum $fs_V$ output from the spectrum calculation unit 28.

That is, the spectrum selection unit 29 compares the peak spectrum included in the frequency spectrum $fs_H$ with the peak spectrum included in the frequency spectrum $fs_V$, and selects the frequency spectrum having the larger peak spectrum.

The distance calculation processing unit 30 is implemented by, for example, a distance calculation processing circuit 75 shown in FIG. 4.

The distance calculation processing unit 30 performs processing of calculating a difference Δf between the frequency related to the frequency component of the reflected light and the frequency related to the frequency component of the reference light, on the basis of the frequency spectrum selected by the spectrum selection unit 29.

Further, the distance calculation processing unit 30 performs processing of calculating the distance from the optical distance measurement device 3 to the measurement target 1 from the calculated difference Δf.

In FIG. 3, it is assumed that each of the polarization rotation unit 25, the phase compensation unit 26, the spectrum calculation unit 28, the spectrum selection unit 29, and the distance calculation processing unit 30, which are the constituent elements of the signal processing unit 24, is implemented by dedicated hardware as shown in FIG. 4. That is, it is assumed that the signal processing unit 24 is implemented by the polarization rotation circuit 71, the phase compensation circuit 72, the spectrum calculation circuit 73, the spectrum selection circuit 74, and the distance calculation processing circuit 75.

Each of the polarization rotation circuit 71, the phase compensation circuit 72, the spectrum calculation circuit 73, the spectrum selection circuit 74, and the distance calculation processing circuit 75 corresponds, for example, to a single circuit, a composite circuit, a programmed processor, a parallel-programmed processor, an application specific integrated circuit (ASIC), a field-programmable gate array (FPGA), or a combination thereof.

The constituent elements of the signal processing unit 24 are not limited to those implemented by dedicated hardware, but the signal processing unit 24 may be implemented by software, firmware, or a combination of software and firmware.

The software or firmware is stored in the memory of the computer as a program. The computer means hardware that executes a program, and corresponds to, for example, a central processing unit (CPU), a central processing unit, a processing unit, an arithmetic unit, a microprocessor, a microcomputer, a processor, or a digital signal processor (DSP).

Figure 5:
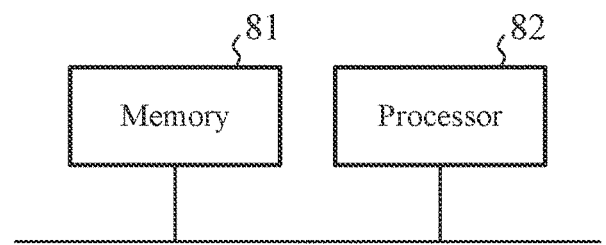
FIG. 5 is a hardware configuration diagram of a computer when the signal processing unit 24 is implemented by software or firmware.

FIG. 5 is a hardware configuration diagram of a computer when the signal processing unit 24 is implemented by software or firmware.

When the signal processing unit 24 is implemented by software or firmware, a program for causing the computer to execute the processing procedure of the polarization rotation unit 25, the phase compensation unit 26, the spectrum calculation unit 28, the spectrum selection unit 29, and the distance calculation processing unit 30, is stored in a memory 81. Then, a processor 82 of the computer executes the program stored in the memory 81.

Further, FIG. 4 shows an example in which each constituent element of the signal processing unit 24 is implemented by dedicated hardware, and FIG. 5 shows an example in which the signal processing unit 24 is implemented by software or firmware. However, some constituent elements of the signal processing unit 24 may be implemented by dedicated hardware, and the remaining constituent elements may be implemented by software or firmware.

Figure 6:
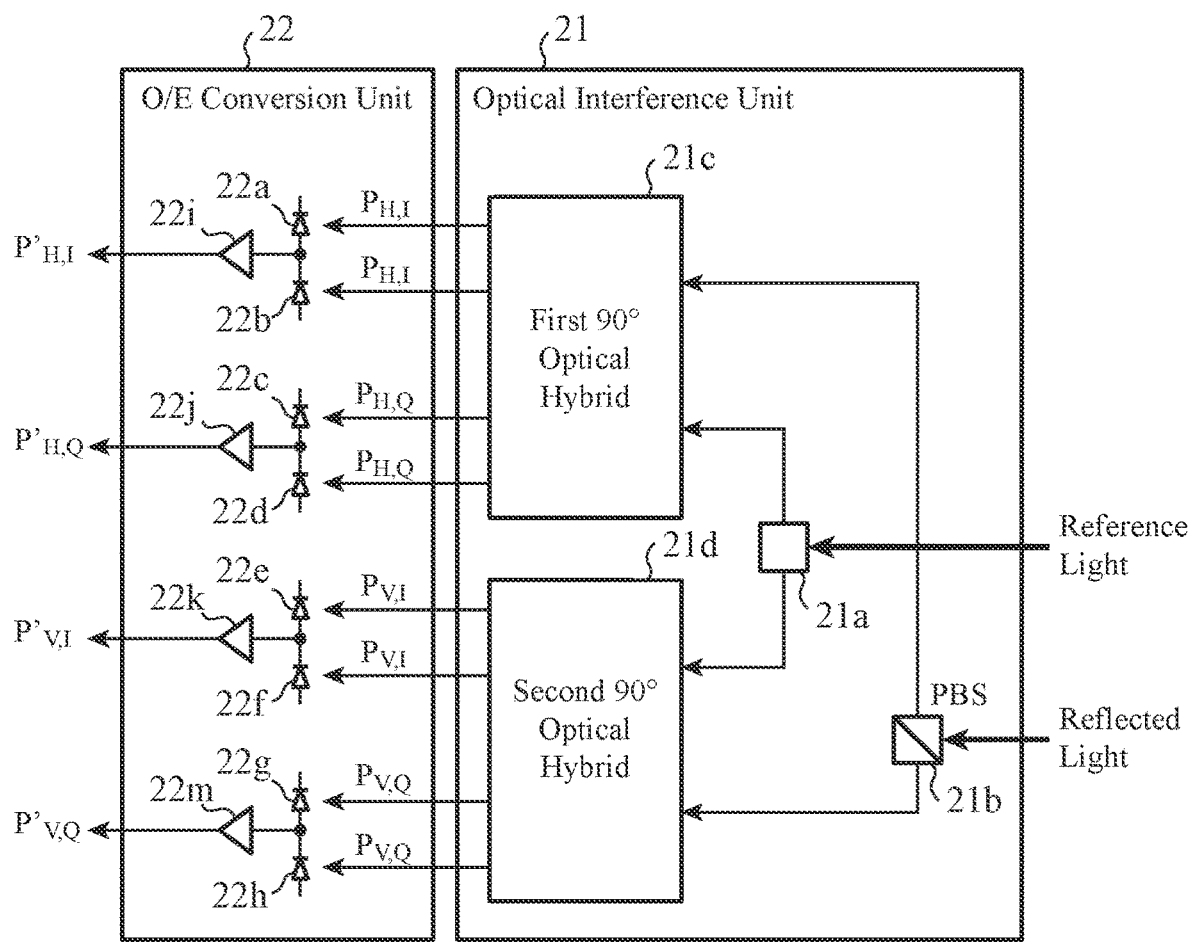
FIG. 6 is a configuration diagram showing the inside of an optical interference unit 21 and an O/E conversion unit 22.

FIG. 6 is a configuration diagram showing the inside of the optical interference unit 21 and the O/E conversion unit 22.

In FIG. 6, an optical coupler 21a splits the reference light output from the optical coupler 13 into two lights, outputs one reference light after branching to a first 90° optical hybrid 21c, and outputs the other reference light after branching to a second 90° optical hybrid 21d.

A PBS 21b is a polarization beam splitter that separates the reflected light output from the circulator 17 into reflected light of a horizontally polarized wave and reflected light of a vertically polarized wave.

The PBS 21b outputs the reflected light of a horizontally polarized wave to the first 90° optical hybrid 21c, and outputs the reflected light of a vertically polarized wave to the second 90° optical hybrid 21d.

The first 90° optical hybrid 21c causes the reflected light of the horizontally polarized wave output from the PBS 21b and the reference light output from the optical coupler 21a to interfere with each other, and extracts the first component $P_{H,I}$ of the horizontally polarized wave and the second component $P_{H,Q}$ of the horizontally polarized wave from the interference light of the reflected light and the reference light.

The first 90° optical hybrid 21c outputs the first component $P_{H,I}$ to pin photodiodes 22a, 22b of the O/E conversion unit 22.

Further, the first 90° optical hybrid 21c outputs the second component $P_{H,Q}$ to pin photodiodes 22c, 22d of the O/E conversion unit 22.

The second 90° optical hybrid 21d causes the reflected light of the vertically polarized wave output from the PBS 21b and the reference light output from the optical coupler 21a to interfere with each other, and extracts the third component $P_{V,I}$ of the vertically polarized wave and the fourth component $P_{V,Q}$ of the vertically polarized wave from the interference light of the reflected light and the reference light.

The second 90° optical hybrid 21d outputs the third component $P_{V,I}$ to pin photodiodes 22e, 22f of the O/E conversion unit 22.

Further, the second 90° optical hybrid 21d outputs the fourth component $P_{V,Q}$ to pin photodiodes 22g, 22h of the O/E conversion unit 22.

The pin photodiodes 22a, 22b are elements in which a current that is directly proportional to the first component $P_{H,I}$ output from the first 90° optical hybrid 21c flows.

At the connection point between the pin photodiode 22a and the pin photodiode 22b, an electric signal having a voltage that is directly proportional to the first component $P_{H,I}$ appears.

The pin photodiodes 22c, 22d are elements in which a current that is directly proportional to the second component $P_{H,Q}$ output from the first 90° optical hybrid 21c flows.

At the connection point between the pin photodiode 22c and the pin photodiode 22d, an electric signal having a voltage that is directly proportional to the second component $P_{H,Q}$ appears.

The pin photodiodes 22e, 22f are elements in which a current that is directly proportional to the third component $P_{V,I}$ output from the second 90° optical hybrid 21d flows.

At the connection point between the pin photodiode 22e and the pin photodiode 22f, an electric signal having a voltage that is directly proportional to the third component $P_{V,I}$ appears.

The pin photodiodes 22g, 22h are elements in which a current that is directly proportional to the fourth component $P_{V,Q}$ output from the second 90° optical hybrid 21d flows.

At the connection point between the pin photodiode 22g and the pin photodiode 22h, an electric signal having a voltage that is directly proportional to the fourth component $P_{V,Q}$ appears.

An amplifier 22i amplifies the electric signal appearing at the connection point between the pin photodiode 22a and the pin photodiode 22b, and outputs the first component $P'_{H,I}$ which is the amplified electric signal to the A/D conversion unit 23.

An amplifier 22j amplifies the electric signal appearing at the connection point between the pin photodiode 22c and the pin photodiode 22d, and outputs the second component $P'_{H,Q}$ which is the amplified electric signal to the A/D conversion unit 23.

An amplifier 22k amplifies the electric signal appearing at the connection point between the pin photodiode 22e and the pin photodiode 22f, and outputs the third component $P'_{V,I}$ which is the amplified electric signal to the A/D conversion unit 23.

An amplifier 22m amplifies the electric signal appearing at the connection point between the pin photodiode 22g and the pin photodiode 22h, and outputs the fourth component $P'_{V,Q}$ which is the amplified electric signal to the A/D conversion unit 23.

Figure 7:
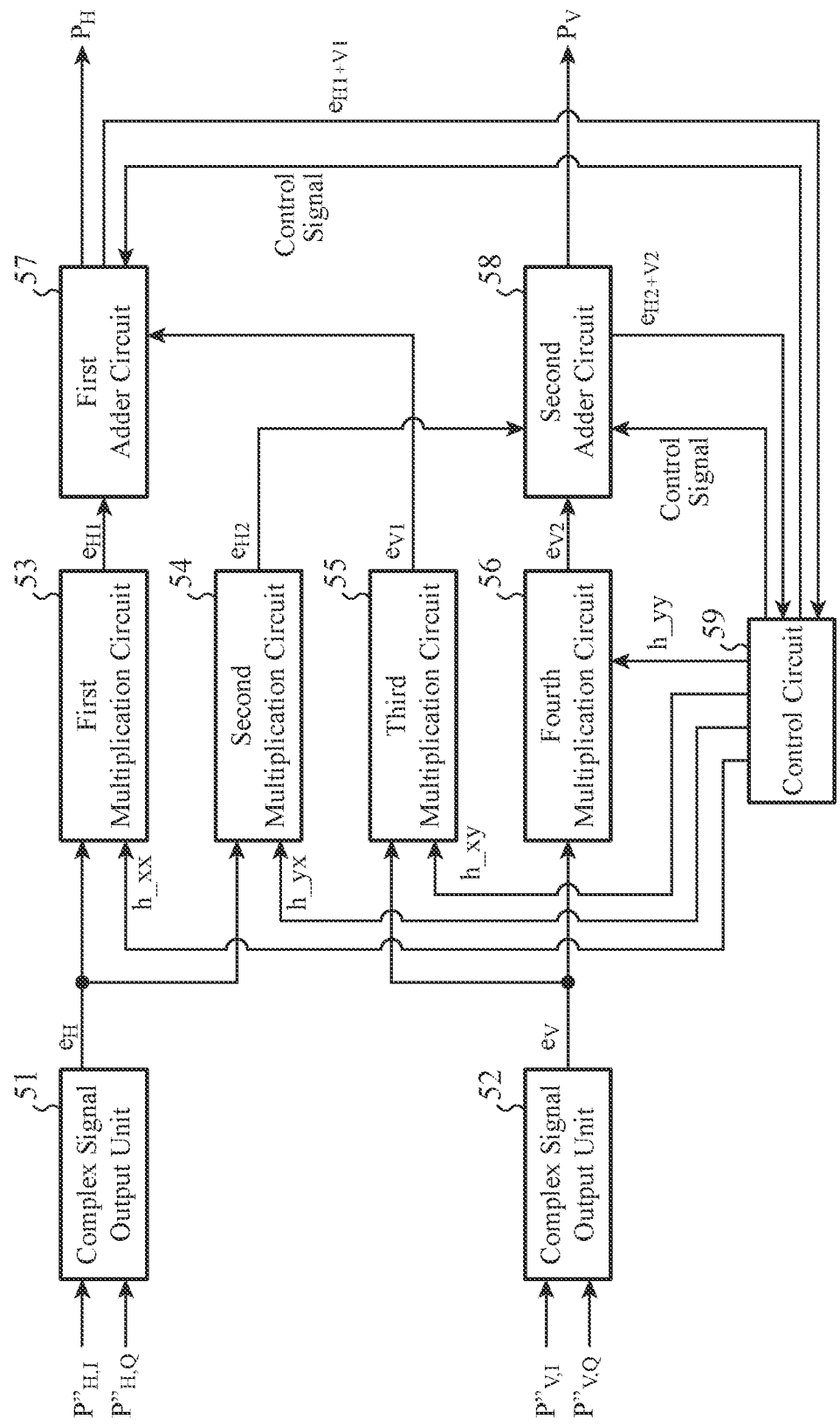
FIG. 7 is a configuration diagram showing the inside of a polarization rotation unit 25.

FIG. 7 is a configuration diagram showing the inside of the polarization rotation unit 25.

In FIG. 7, a complex signal output unit 51 constructs the complex signal ex from the first component $P''_{H,I}$ which is a digital signal output from the A/D conversion unit 23 and the second component $P''_{H,Q}$ which is a digital signal output from the A/D conversion unit 23.

The complex signal output unit 51 outputs the complex signal $e_H$ to each of a first multiplication circuit 53 and a second multiplication circuit 54.

A complex signal output unit 52 constructs the complex signal $e_V$ from the third component $P''_{V,I}$ which is a digital signal output from the A/D conversion unit 23 and the fourth component $P''_{V,Q}$ which is a digital signal output from the A/D conversion unit 23.

The complex signal output unit 52 outputs the complex signal $e_V$ to each of a third multiplication circuit 55 and a fourth multiplication circuit 56.

The first multiplication circuit 53 multiplies the complex signal ex output from the complex signal output unit 51 by a coefficient h_xx output from a control circuit 59 to rotate the polarization angle of the complex signal $e_H$, and outputs a complex signal $e_{H1}$ which is a complex signal after the rotation, to a first adder circuit 57.

The second multiplication circuit 54 multiplies the complex signal $e_V$ output from the complex signal output unit 51 by a coefficient h_yx output from the control circuit 59 to rotate the polarization angle of the complex signal $e_V$, and outputs a complex signal $e_{V1}$, which is a complex signal after the rotation, to a second adder circuit 58.

The third multiplication circuit 55 multiplies the complex signal $e_V$ output from the complex signal output unit 52 by a coefficient h_xy output from the control circuit 59 to rotate the polarization angle of the complex signal $e_V$, and outputs a complex signal $e_{V1}$, which is a complex signal after the rotation, to the first adder circuit 57.

The fourth multiplication circuit 56 multiplies the complex signal $e_V$ output from the complex signal output unit 52 by a coefficient h_yy output from the control circuit 59 to rotate the polarization angle of the complex signal $e_V$, and outputs a complex signal $e_{V2}$, which is a complex signal after the rotation, to the second adder circuit 58.

The first adder circuit 57 adds the complex signal em output from the first multiplication circuit 53 and the complex signal $e_{V1}$ output from the third multiplication circuit 55, and outputs an added signal $e_{H1+V1}$ of the complex signal em and the complex signal $e_{V1}$ to the control circuit 59.

The second adder circuit 58 adds the complex signal $e_{H2}$ output from the second multiplication circuit 54 and the complex signal $e_{V2}$ output from the fourth multiplication circuit 56, and outputs an added signal $e_{H2+V2}$ of the complex signal $e_{H2}$ and the complex signal $e_{V2}$ to the control circuit 59.

The control circuit 59 adjusts each of the coefficient h_xx, the coefficient h_yx, the coefficient h_xy and the coefficient h_yy so that the polarization angle of the added signal $e_{H1+V1}$ is 0° and the polarization angle of the added signal $e_{H2+V2}$ is 90°.

When the polarization angle of the added signal $e_{H1+V1}$ is 0° and the polarization angle of the added signal $e_{H2+V2}$ is 90°, the control circuit 59 outputs, to the first adder circuit 57, a control signal indicating that the added signal $e_{H1+V1}$ is output as the horizontal component $P_H$ to the phase compensation unit 26.

Further, when the polarization angle of the added signal $e_{H1+V1}$ is 0° and the polarization angle of the added signal $e_{H2+V2}$ is 90°, the control circuit 59 outputs, to the second adder circuit 58, a control signal indicating that the added signal $e_{H2+V2}$ is output as the vertical component $P_V$ to the phase compensation unit 26.

Figure 8:
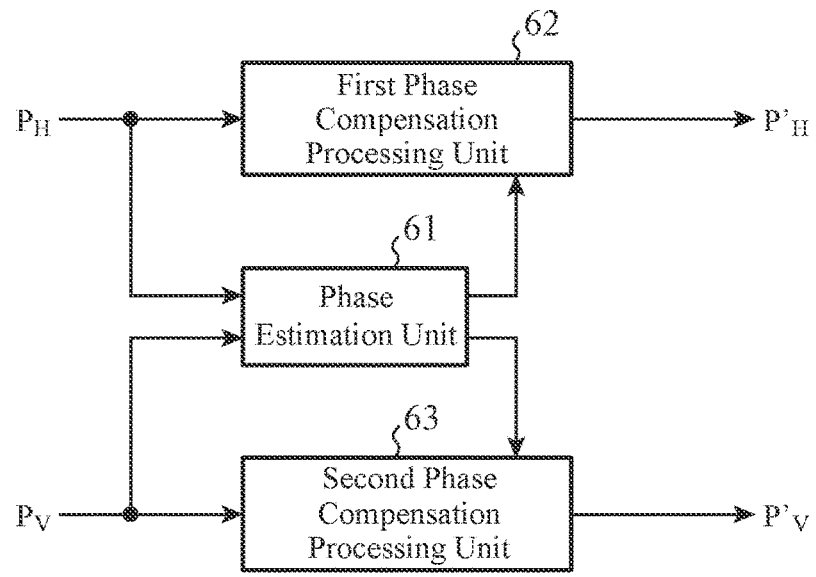
FIG. 8 is a configuration diagram showing the inside of a phase compensation unit 26.

FIG. 8 is a configuration diagram showing the inside of the phase compensation unit 26.

In FIG. 8, a phase estimation unit 61 constructs a complex signal $e_{H,V}$ from the horizontal component $P_H$ and the vertical component $P_V$ output from the polarization rotation unit 25.

The phase estimation unit 61 estimates a phase $\theta_{noise}$ of the noise component contained in the complex signal $e_{H,V}$ using, for example, the m-th power method.

In the optical distance measurement device 3 of the first embodiment, m=4 because the phase shift keying is QPSK. Therefore, the phase estimation unit 61 can estimate the phase $\theta_{noise}$ of the noise component by raising the phase of the complex signal $e_{H,V}$ to the fourth power.

The phase estimation unit 61 subtracts the phase $\theta_{noise}$ of the noise component from the phase of the complex signal $e_{H,V}$, and outputs the complex signal $e'_{H,V}$ after the phase subtraction to each of a first phase compensation processing unit 62 and a second phase compensation processing unit 63.

The first phase compensation processing unit 62 outputs the horizontal component $P'_H$ in the complex signal $e'_{H,V}$ output from the phase estimation unit 61 to the spectrum calculation unit 28.

The second phase compensation processing unit 63 outputs the vertical component $P'_V$ in the complex signal $e'_{H,V}$ output from the phase estimation unit 61 to the spectrum calculation unit 28.

Figure 9:
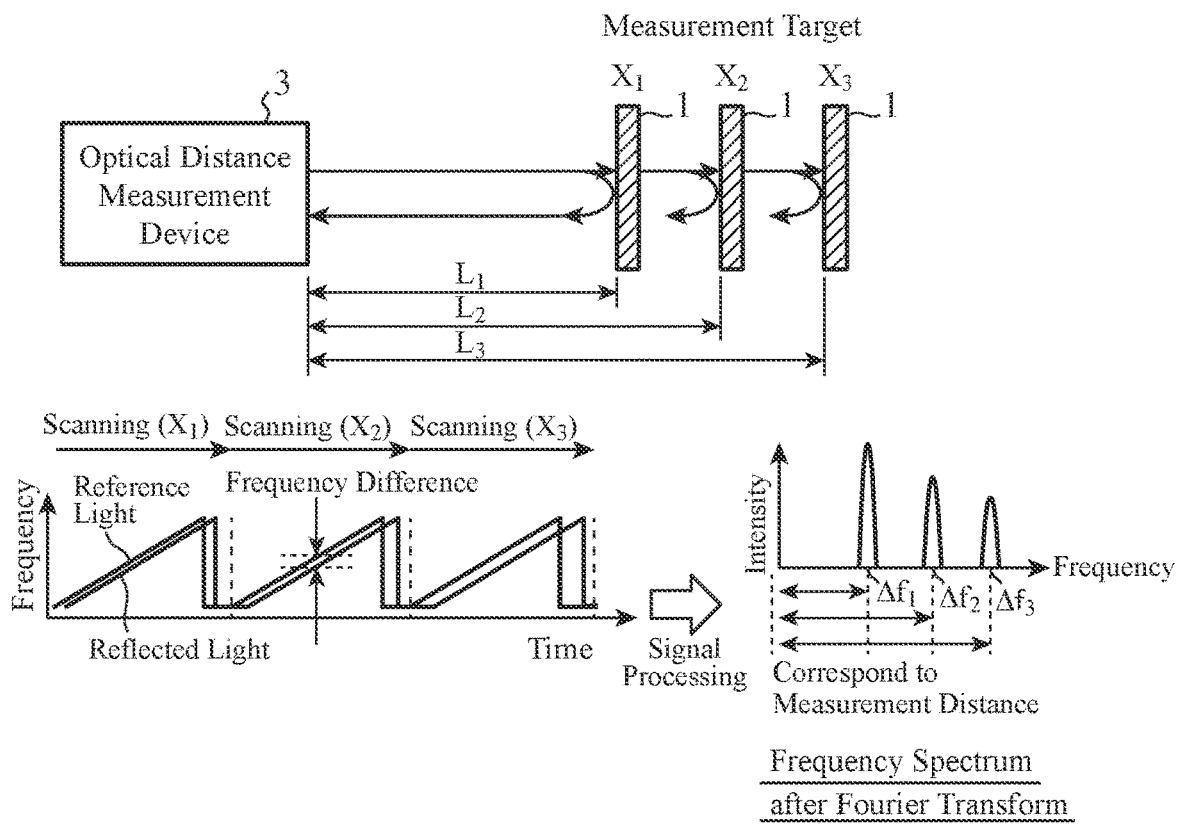
FIG. 9 is an explanatory diagram showing distance measurement processing by the optical distance measurement device 3.

FIG. 9 is an explanatory diagram showing distance measurement processing by the optical distance measurement device 3.

FIG. 9 shows an example in which the optical distance measurement device 3 measures the distances to the three measurement targets 1.

The three measurement targets 1 illustrated in FIG. 9 are present at respective positions $X_1$, $X_2$, and $X_3$, and the distances from the optical distance measurement device 3 are $L_1$, $L_2$, and $L_3$. The relation of $L_1<L_2<L_3$ is established.

Next, the operation of the optical distance measurement device 3 shown in FIG. 2 will be described.

The optical output unit 10 outputs, as reference light, the frequency-swept light of a horizontally polarized wave whose frequency changes with lapse of time to the signal processor 20.

Further, the optical output unit 10 multiplexes the polarized waves of the frequency-swept light, and outputs the frequency-swept light of a horizontally polarized wave and a vertically polarized wave to the optical transmission and reception unit 16.

Hereinafter, the output operation of the frequency-swept light by the optical output unit 10 will be specifically described.

The frequency change signal generator 11 outputs a sawtooth wave signal to the laser light source 12 as a frequency change signal whose frequency changes with lapse of time.

Figure 10:
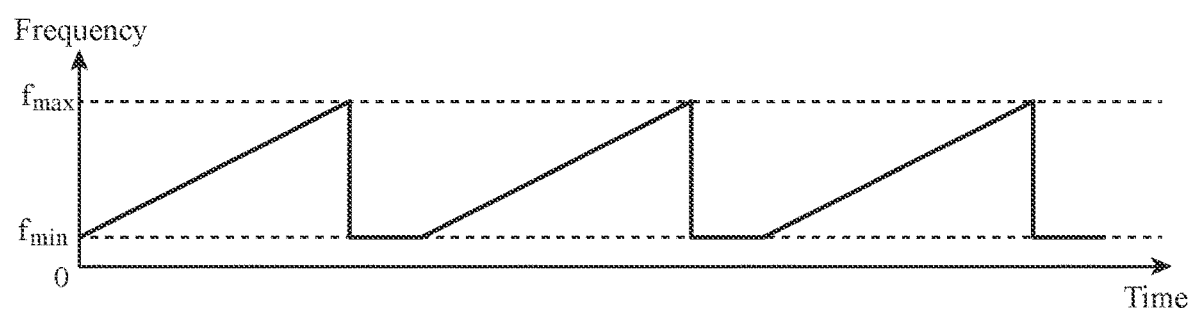
FIG. 10 is an explanatory diagram showing a waveform of a sawtooth wave signal.

FIG. 10 is an explanatory diagram showing the waveform of a sawtooth wave signal.

The sawtooth wave signal is a signal whose frequency changes from the minimum frequency $f_{min}$ to the maximum frequency $f_{max}$ with lapse of time.

When the frequency of the sawtooth wave signal reaches the maximum frequency $f_{max}$, it once returns to the minimum frequency $f_{min}$ and then changes again from the minimum frequency $f_{min}$ to the maximum frequency $f_{max}$.

Upon receiving the sawtooth wave signal from the frequency change signal generator 11, the laser light source 12 outputs, to the optical coupler 13, the frequency-swept light of a horizontally polarized wave whose frequency changes with lapse of time in synchronization with the frequency change of the sawtooth wave signal.

Here, the frequency of the frequency-swept light may be the same as the frequency of the sawtooth wave signal, but is generally higher than the frequency of the sawtooth wave signal, and the frequency of the frequency-swept light increases as the frequency of the sawtooth wave signal increases, and decreases as the frequency of the sawtooth wave signal decreases. Therefore, the waveform of the frequency-swept light becomes a sawtooth wave.

Upon receiving the frequency-swept light of the horizontally polarized wave from the laser light source 12, the optical coupler 13 splits the frequency-swept light into two lights, outputs one frequency-swept light after branching to the polarization multiplexing unit 15, and outputs the other frequency-swept light after branching to the optical interference unit 21 as reference light.

The phase modulation signal generator 14 generates a phase modulation signal for phase modulating the frequency-swept light by QPSK, and outputs the phase modulation signal to the polarization multiplexing unit 15.

Upon receiving the frequency-swept light of the horizontally polarized wave from the optical coupler 13, the polarization multiplexing unit 15 generates the frequency-swept light of the vertically polarized wave from the frequency-swept light of the horizontally polarized wave, and multiplexes the frequency-swept light of the horizontally polarized wave and the frequency-swept light of the vertically polarized wave.

The polarization multiplexing unit 15 phase-shift-keys the frequency-swept light after polarization multiplexing according to the phase modulation signal output from the phase modulation signal generator 14, and outputs the frequency-swept light after the phase shift keying to the circulator 17.

The circulator 17 outputs the frequency-swept light output from the polarization multiplexing unit 15 to the lens 18.

Upon receiving the frequency-swept light from the circulator 17, the lens 18 emits the frequency-swept light toward the measurement target 1 in the space.

Since the frequency-swept light changes in waveform due to the influence of phase fluctuation or the like in the laser light source 12, when it is reflected by the measurement target 1, the polarization plane may rotate.

The lens 18 collects the frequency-swept light reflected by the measurement target 1 as reflected light, and outputs the reflected light to the circulator 17.

Upon receiving the reflected light from the lens 18, the circulator 17 outputs the reflected light to the optical interference unit 21.

Upon receiving the reference light from the optical coupler 13, the optical coupler 21a of the optical interference unit 21 splits the reference light into two lights, outputs one reference light after branching to the first 90° optical hybrid 21c, and outputs the other reference light after branching to the second 90° optical hybrid 21d.

Upon receiving the reflected light from the circulator 17, the PBS 21b separates the reflected light into reflected light of a horizontally polarized wave and reflected light of a vertically polarized wave.

The PBS 21b outputs the reflected light of a horizontally polarized wave to the first 90° optical hybrid 21c, and outputs the reflected light of a vertically polarized wave to the second 90° optical hybrid 21d.

The first 90° optical hybrid 21c causes the reflected light of the horizontally polarized wave output from the PBS 21b and one reference light after branching output from the optical coupler 21a to interfere with each other.

The first 90° optical hybrid 21c extracts, from the interference light of the reflected light of the horizontally polarized wave and the reference light, the first component $P_{H,I}$ of the horizontally polarized wave and the second component $P_{H,Q}$ of the horizontally polarized wave.

The first 90° optical hybrid 21c outputs the first component $P_{H,I}$ of the horizontally polarized wave to the pin photodiodes 22a, 22b of the O/E conversion unit 22.

Further, the first 90° optical hybrid 21c outputs the second component $P_{H,Q}$ of the horizontally polarized wave to the pin photodiodes 22c, 22d of the O/E conversion unit 22.

The second 90° optical hybrid 21d causes the reflected light of a vertically polarized wave output from the PBS 21b and the other reference light after branching output from the optical coupler 21a to interfere with each other.

The second 90° optical hybrid 21d extracts, from the interference light of the reflected light of the vertically polarized wave and the reference light, the third component $P_{V,I}$ and the fourth component $P_{V,Q}$ of the vertically polarized wave.

The second 90° optical hybrid 21d outputs the third component $P_{V,I}$ of the vertically polarized wave to the pin photodiodes 22e, 22f of the O/E conversion unit 22.

In addition, the second 90° optical hybrid 21d outputs the fourth component $P_{V,Q}$ of the vertically polarized wave to the pin photodiodes 22g, 22h of the O/E conversion unit 22.

In the pin photodiodes 22a, 22b of the O/E conversion unit 22, a current that is directly proportional to the first component $P_{H,I}$ output from the first 90° optical hybrid 21c flows.

Therefore, an electric signal having a voltage that is directly proportional to the first components $P_{H,I}$ appears at the connection point between the pin photodiode 22a and the pin photodiode 22b.

The amplifier 22i amplifies the electric signal appearing at the connection point between the pin photodiode 22a and the pin photodiode 22b, and outputs the first component $P'_{H,I}$ which is the amplified electric signal to the A/D conversion unit 23.

In the pin photodiodes 22c, 22d of the O/E conversion unit 22, a current that is directly proportional to the second components $P_{H,Q}$ output from the first 90° optical hybrid 21c flows.

Therefore, an electric signal having a voltage that is directly proportional to the second components $P_{H,Q}$ appears at the connection point between the pin photodiode 22c and the pin photodiode 22d.

The amplifier 22j amplifies the electric signal appearing at the connection point between the pin photodiode 22c and the pin photodiode 22d, and outputs the second component $P'_{H,Q}$ which is the amplified electric signal to the A/D conversion unit 23.

In the pin photodiodes 22e, 22f of the O/E conversion unit 22, a current that is directly proportional to the third component $P_{V,I}$ output from the second 90° optical hybrid 21d flows.

Therefore, an electric signal having a voltage that is directly proportional to the third component $P_{V,I}$ appears at the connection point between the pin photodiode 22e and the pin photodiode 22f.

The amplifier 22k amplifies the electric signal appearing at the connection point between the pin photodiode 22e and the pin photodiode 22f, and outputs the third component $P'_{V,I}$ which is the amplified electric signal to the A/D conversion unit 23.

In the pin photodiodes 22g, 22h of the O/E conversion unit 22, a current that is directly proportional to the fourth component $P_{V,Q}$ output from the second 90° optical hybrid 21d flows.

Therefore, an electric signal having a voltage that is directly proportional to the fourth component $P_{V,Q}$ appears at the connection point between the pin photodiode 22g and the pin photodiode 22h.

The amplifier 22m amplifies the electric signal appearing at the connection point between the pin photodiode 22g and the pin photodiode 22h, and outputs the fourth component $P'_{V,Q}$ which is the amplified electric signal to the A/D conversion unit 23.

The A/D conversion unit 23 converts each of the first component $P'_{H,I}$, the second component $P'_{H,Q}$, the third component $P'_{V,I}$ and the fourth component $P'_{V,Q}$, which are output from the O/E conversion unit 22, from an analog signal to a digital signal.

The A/D conversion unit 23 outputs each of a first component $P''_{H,I}$, a second component $P''_{H,Q}$, a third component $P''_{V,I}$ and a fourth component $P''_{V,Q}$, which are digital signals, to the polarization rotation unit 25 of the signal processing unit 24.

The polarization rotation unit 25 rotates the complex signal ex having the first component P"mi and the second component $P''_{H,Q}$ output from the A/D conversion unit 23, thereby matching the first component $P''_{H,I}$ with the horizontal component, and matching the second component $P''_{H,Q}$ with the vertical component.

Further, the polarization rotation unit 25 rotates the complex signal $e_V$ having the third component $P''_{V,I}$ and the fourth component $P''_{V,Q}$ output from the A/D conversion unit 23, thereby matching the third component $P''_{V,I}$ with the horizontal component, and matching the fourth component $P''_{V,Q}$ with the vertical component.

The polarization rotation unit 25 rotates the complex signal ex, so that the first component $P''_{V,I}$ matches the horizontal component and the second component $P''_{H,Q}$ matches the vertical component even when the polarization plane of the light is rotated.

Further, the polarization rotation unit 25 rotates the complex signal $e_V$, so that the third component $P''_{V,I}$ matches the horizontal component and the fourth component $P''_{V,Q}$ matches the vertical component even when the polarization plane of the light is rotated.

However, when the complex signal ex contains a noise component, in the case where the polarization rotation unit 25 only rotates the complex signal $e_H$, the first component $P''_{H,I}$ does not match the horizontal component, and the second component $P''_{H,Q}$ does not match the vertical component.

Further, when the complex signal $e_V$ contains a noise component, in the case where the polarization rotation unit 25 only rotates the complex signal $e_V$, the third component $P''_{V,I}$ does not match the horizontal component, and the fourth component $P''_{V,Q}$ does not match the vertical component.

The polarization rotation processing by the polarization rotation unit 25 will be specifically described below.

The complex signal output unit 51 constructs the complex signal ex from the first component $P''_{H,I}$ which is a digital signal output from the A/D conversion unit 23 and the second component $P''_{H,Q}$ which is a digital signal output from the A/D conversion unit 23.

The complex signal output unit 51 outputs the complex signal ex to each of the first multiplication circuit 53 and the second multiplication circuit 54.

The complex signal output unit 52 constructs the complex signal $e_V$ from the third component $P''_{V,I}$ which is a digital signal output from the A/D conversion unit 23 and the fourth component $P''_{V,Q}$ which is a digital signal output from the A/D conversion unit 23.

The complex signal output unit 52 outputs the complex signal $e_V$ to each of the third multiplication circuit 55 and the fourth multiplication circuit 56.

Upon receiving the complex signal ex from the complex signal output unit 51, the first multiplication circuit 53 multiplies the complex signal ex by the coefficient h_xx output from the control circuit 59 to rotate the polarization angle of the complex signal ex.

The first multiplication circuit 53 outputs the complex signal em which is the rotated complex signal to the first adder circuit 57.

Upon receiving the complex signal ex from the complex signal output unit 51, the second multiplication circuit 54 multiplies the complex signal ex by the coefficient h_yx output from the control circuit 59 to rotate the polarization angle of the complex signal ex.

The second multiplication circuit 54 outputs the complex signal $e_{H2}$ which is the rotated complex signal to the second adder circuit 58.

Upon receiving the complex signal $e_V$ from the complex signal output unit 52, the third multiplication circuit 55 multiplies the complex signal $e_V$ by the coefficient h_xy output from the control circuit 59 to rotate the polarization angle of the complex signal $e_V$.

The third multiplication circuit 55 outputs the complex signal $e_{V1}$ which is the rotated complex signal to the first adder circuit 57.

Upon receiving the complex signal $e_V$ from the complex signal output unit 52, the fourth multiplication circuit 56 multiplies the complex signal $e_V$ by the coefficient h_yy output from the control circuit 59 to rotate the polarization angle of the complex signal $e_V$.

The fourth multiplication circuit 56 outputs the complex signal $e_{V2}$ which is the rotated complex signal to the second adder circuit 58.

The first adder circuit 57 adds the complex signal em output from the first multiplication circuit 53 and the complex signal $e_{V1}$ output from the third multiplication circuit 55, and outputs an added signal $e_{H1+V1}$ of the complex signal em and the complex signal $e_{V1}$ to the control circuit 59.

The second adder circuit 58 adds the complex signal $e_{H2}$ output from the second multiplication circuit 54 and the complex signal $e_{V2}$ output from the fourth multiplication circuit 56, and outputs an added signal $e_{H2+V2}$ of the complex signal $e_{H2}$ and the complex signal $e_{V2}$ to the control circuit 59.

The control circuit 59 acquires, as a feedback signal, each of the added signal $e_{H1+V1}$ output from the first adder circuit 57 and the added signal $e_{H2+V2}$ output from the second adder circuit 58.

The control circuit 59 performs feedback control of adjusting each of the coefficient h_xx, the coefficient h_yx, the coefficient h_xy, and the coefficient h_yy so that the polarization angle of the added signal $e_{H1+V1}$ is 0° and the polarization angle of the added signal $e_{H2+V2}$ is 90°.

When the polarization angle of the added signal $e_{H1+V1}$ is 0° and the polarization angle of the added signal $e_{H2+V2}$ is 90°, the control circuit 59 outputs, to the first adder circuit 57, a control signal indicating that the added signal $e_{H1+V1}$ is output as the horizontal component $P_H$ to the phase compensation unit 26.

Further, when the polarization angle of the added signal $e_{H1+V1}$ is 0° and the polarization angle of the added signal $e_{H2+V2}$ is 90°, the control circuit 59 outputs, to the second adder circuit 58, a control signal indicating that the added signal $e_{H2+V2}$ is output as the vertical component $P_V$ to the phase compensation unit 26.

Upon receiving the control signal from the control circuit 59, the first adder circuit 57 outputs the added signal $e_{H1+V1}$ as the horizontal component $P_H$ to the phase compensation unit 26.

Upon receiving the control signal from the control circuit 59, the second adder circuit 58 outputs the added signal $e_{H2+V2}$ as the vertical component $P_V$ to the phase compensation unit 26.

Here, the first adder circuit 57 outputs the added signal $e_{H1+V1}$ as the horizontal component $P_H$ to the phase compensation unit 26, but if the noise component contained in the added signal $e_{H1+V1}$ is small enough to be ignored, the phase compensation processing of the phase compensation unit 26 is unnecessary. Therefore, the first adder circuit 57 may output the horizontal component $P_H$ to the spectrum calculation unit 28 without outputting the added signal $e_{H1+V1}$ to the phase compensation unit 26.

Further, the second adder circuit 58 outputs the added signal $e_{H2+V2}$ as the vertical component $P_V$ to the phase compensation unit 26, but if the noise component contained in the added signal $e_{H2+V2}$ is small enough to be ignored, the phase compensation processing of the phase compensation unit 26 is unnecessary. Therefore, the second adder circuit 58 may output the vertical component $P_V$ to the spectrum calculation unit 28 without outputting the vertical component $P_V$ to the phase compensation unit 26.

The phase compensation unit 26 performs the phase compensation processing of removing a noise component contained in the complex signal $e_{H,V}$ constructed from the horizontal component $P_H$ and the vertical component $P_V$ output from the polarization rotation unit 25. The noise component may be phase fluctuation or the like in the laser light source 12.

When the complex signal $e_{H,V}$ contains a noise component, the phase θH of the horizontal component $P_H$ deviates from 0° by the phase $\theta_{noise}$ of the noise component.

When the complex signal $e_{H,V}$ contains a noise component, the phase θv of the vertical component $P_V$ deviates from 90° by the phase $\theta_{noise}$ of the noise component.

Figure 11:
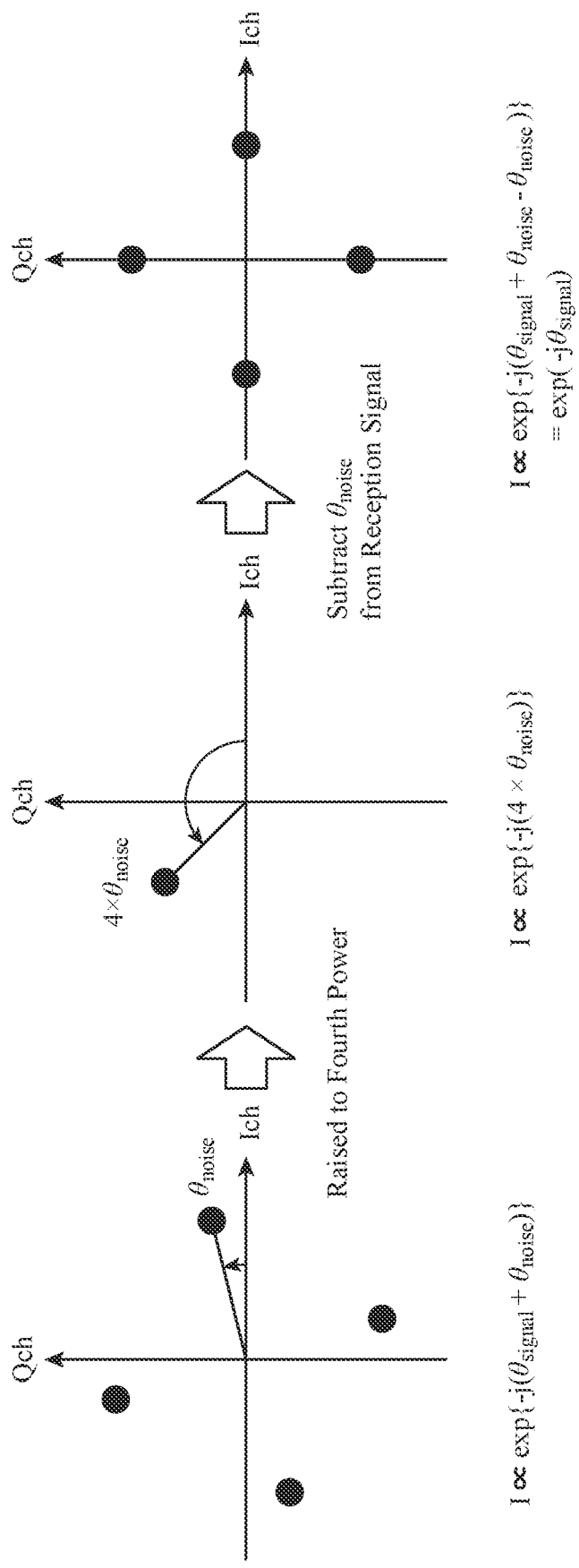
FIG. 11 is an explanatory diagram showing phase compensation processing of the phase compensation unit 26.

FIG. 11 is an explanatory diagram showing the phase compensation processing of the phase compensation unit 26.

Hereinafter, the phase compensation processing of the phase compensation unit 26 will be specifically described while referring to FIG. 11.

First, the phase estimation unit 61 constructs a complex signal $e_{H,V}$ from the horizontal component $P_H$ and the vertical component $P_V$ output from the polarization rotation unit 25.

Constructing the complex signal $e_{H,V}$ from the horizontal component $P_H$ and the vertical component $P_V$ is a well-known technique, so a detailed description thereof will be omitted.

The true phase of the complex signal $e_{H,V}$ is $\theta_{signal}$ represented by the following equation (1), but when the phase of the complex signal $e_{H,V}$ contains the phase $\theta_{noise}$ of the noise component, the true phase is $(\theta_{signal}+\theta_{noise})$.

$$\theta_{signal} = 0, \frac{\pi}{2}, \pi, \frac{3\pi}{2} \tag{1}$$

Further, the electric power W of the complex signal $e_{H,V}$ is proportional to the phase ($\theta_{signal}+\theta_{noise}$) of the complex signal $e_{H,V}$ as shown in the following expression (2).

$$W \propto \exp\{-j(\theta_{signal}+\theta_{noise})\} \quad (2)$$

When the phase $\theta_{noise}$ of the noise component contained in the phase of the complex signal $e_{mv}$ is calculated using the m-th power method, m in the m-th power method is 4 because the phase shift keying by the polarization multiplexing unit 15 is QPSK. Incidentally, if the phase shift keying by the polarization multiplexing unit 15 is BPSK, m in the m-th power method is 2.

Therefore, the value obtained by raising the phase ($\theta_{signal}+\theta_{noise}$) of the complex signal $e_{H,V}$ to the fourth power is $4 \times \theta_{noise}$.

FIG. 11 shows that the true phase $\theta_{signal}$ of the complex signal $e_{H,V}$ disappears and only $4 \times \theta_{noise}$ remains by raising the phase ($\theta_{signal}\ \theta_{noise}$) of the complex signal $e_{H,V}$ to the fourth power.

Note that, since the phase shift keying by the polarization multiplexing unit 15 is QPSK, the electric power W of the complex signal $e_{H,V}$ is, as shown in the following expression (3), also proportional to a value obtained by raising the phase ($\theta_{signal}\ \theta_{noise}$) of the complex signal $e_{H,V}$ to the fourth power.

$$W \propto \exp\{-j(4 \times \theta_{noise})\} \quad (3)$$

The phase estimation unit 61 calculates $4 \times \theta_{noise}$ by raising the phase ($\theta_{signal}+\theta_{noise}$) of the complex signal $e_{H,V}$ to the fourth power.

Next, the phase estimation unit 61 calculates the phase $\theta_{noise}$ of the noise component by multiplying $4 \times \theta_{noise}$ by ¼.

The phase estimation unit 61, as shown in the following equation (4), subtracts the phase $\theta_{noise}$ of the noise component from the phase ($\theta_{signal}+\theta_{noise}$) of the complex signal $e_{H,V}$.

$$\theta'_{signal}=(\theta_{signal}+\theta_{noise})-\theta_{noise} \quad (4)$$

The phase estimation unit 61 outputs the complex signal $e'_{H,V}$ after phase subtraction to one or more phase compensation processing units of the first phase compensation processing unit 62 and the second phase compensation processing unit 63.

Upon receiving the complex signal $e'_{H,V}$ from the phase estimation unit 61, the first phase compensation processing unit 62 outputs the horizontal component $P'_H$ in the complex signal $e'_{H,V}$ to the spectrum calculation unit 28.

Upon receiving the complex signal $e'_{H,V}$ from the phase estimation unit 61, the second phase compensation processing unit 63 outputs the vertical component P'y in the complex signal $e'_{H,V}$ to the spectrum calculation unit 28.

Upon receiving the horizontal component $P'_H$ from the polarization rotation unit 25, the spectrum calculation unit 28 calculates the frequency spectrum $fs_H$ of the horizontal component $P'_H$ by Fourier-transforming the horizontal component $P'_H$.

Further, upon receiving the vertical component $P'_V$ from the polarization rotation unit 25, the spectrum calculation unit 28 calculates the frequency spectrum $fs_V$ of the vertical component $P'_V$ by Fourier-transforming the vertical component $P'_V$.

The spectrum calculation unit 28 outputs each of the frequency spectrum $fs_H$ of the horizontal component $P'_H$ and the frequency spectrum $fs_V$ of the vertical component $P'_V$ to the spectrum selection unit 29.

The spectrum selection unit 29 selects one of the frequency spectrum $fs_H$ and the frequency spectrum $fs_V$ output from the spectrum calculation unit 28, and outputs the selected frequency spectrum to the distance calculation processing unit 30.

That is, the spectrum selection unit 29 compares the peak spectrum included in the frequency spectrum $fs_H$ with the peak spectrum included in the frequency spectrum $fs_V$, and selects the frequency spectrum having the larger peak spectrum.

Since the time at which the reflected light reaches the optical interference unit 21 is later than the time at which the reference light reaches the optical interference unit 21, there is a time difference between the arrival time of the reflected light at the optical interference unit 21 and the arrival time of the reference light at the optical interference unit 21.

The frequency spectrum $fs_H$ and the frequency spectrum $fs_V$ contain a frequency difference component corresponding to the above time difference, and the frequency difference is directly proportional to the distance to the measurement target 1. The frequency difference is the difference between the frequency of the reflected light and the frequency of the reference light.

Therefore, no matter which frequency spectrum is selected from the frequency spectrum $fs_H$ and the frequency spectrum $fs_V$, the distance calculation processing unit 30 in the subsequent stage can calculate the frequency difference component corresponding to the time difference. However, since the frequency spectrum having the larger peak spectrum improves the calculation accuracy of the frequency difference in the distance calculation processing unit 30, the spectrum selection unit 29 selects the frequency spectrum having the larger peak spectrum.

FIG. 9 illustrates a measurement target 1 having a distance of $L_1$ from the optical distance measurement device 3, a measurement target 1 having a distance of $L_2$, and a measurement target 1 having a distance of $L_3$.

In the example of FIG. 9, when the reflected light to the optical interference unit 21 is the reflected light reflected by the measurement target 1 whose distance from the optical distance measurement device 3 is $L_1$, the frequency difference $\Delta f$ between the frequency of the reflected light and the frequency of the reference light is $\Delta f_1$. The reflected light reflected by the measurement target 1 whose distance from the optical distance measurement device 3 is $L_1$ is the reflected light in the time period indicated by scanning ($X_1$).

When the reflected light to the optical interference unit 21 is the reflected light reflected by the measurement target 1 whose distance from the optical distance measurement device 3 is $L_2$, the frequency difference $\Delta f$ is $\Delta f_2$. The reflected light reflected by the measurement target 1 whose distance from the optical distance measurement device 3 is $L_2$ is the reflected light in the time period indicated by scanning ($X_2$).

When the reflected light to the optical interference unit 21 is the reflected light reflected by the measurement target 1 whose distance from the optical distance measurement device 3 is $L_3$, the frequency difference $\Delta f$ is $\Delta f_3$. The reflected light reflected by the measurement target 1 whose distance from the optical distance measurement device 3 is $L_3$ is the reflected light in the time period indicated by scanning ($X_3$). The relation of $\Delta f_1 < \Delta f_2 < \Delta f_3$ is established.

Upon receiving the frequency spectrum from the spectrum selection unit 29, the distance calculation processing unit 30 calculates the frequency difference $\Delta f$ included in the frequency spectrum.

The distance calculation processing unit 30 calculates the distance L from the optical distance measurement device 3 to the measurement target 1 from the frequency difference Δf.

Since the processing itself for calculating the distance L from the frequency difference Δf is a known technique, detailed description thereof will be omitted.

In the first embodiment described above, the optical distance measurement device 3 is configured to include the optical interference unit 21 for separating the reflected light into a reflected light of a first polarized wave and a reflected light of a second polarized wave, extracting first and second components orthogonal to each other from an interference light of the reflected light of the first polarized wave and the reference light, and extracting third and fourth components orthogonal to each other from an interference light of the reflected light of the second polarized wave and the reference light, and the polarization rotation unit 25 for acquiring one or more components of horizontal and vertical components of a polarized wave by rotating a polarization angle of a first complex signal having the first and second components and a polarization angle of a second complex signal having the third and fourth components, so that the distance calculation unit 27 calculates, on the basis of the components acquired by the polarization rotation unit 25, a difference between a frequency of the reflected light and a frequency of the reference light, and calculates a distance to the measurement target 1 from the difference. Therefore, the optical distance measurement device 3 can measure the distance to the measurement target 1 even when the polarization plane of light is rotated.

It should be noted that the invention of the present application is capable of modifying any of the constituent elements of the embodiment or omitting any of the constituent elements of the embodiment within the scope of the invention.

INDUSTRIAL APPLICABILITY

The present invention is suitable for an optical distance measurement device that calculates the distance to a measurement target.

Further, the present invention is suitable for a machining device including the optical distance measurement device.

REFERENCE SIGNS LIST

1: measurement target,
2: machining device,
3: optical distance measurement device,
4: machining unit,
10: optical output unit (optical output generator),
11: frequency change signal generator,
12: laser light source,
13: optical coupler,
14: phase modulation signal generator,
15: polarization multiplexing unit,
16: optical transmission and reception unit (optical receiver-transmitter),
17: circulator,
18: lens,
20: signal processor,
21: optical interference unit (optical interferometer),
21a: optical coupler,
21b: PBS,
21c: first 90° optical hybrid,
21d: second 90° optical hybrid,
22a, 22b, 22c, 22d, 22e, 22f, 22g, and 22h: pin photodiode,
22i, 22j, 22k, and 22m: amplifier,
51 and 52: complex signal output unit,
53: first multiplication circuit,
54: second multiplication circuit,
55: third multiplication circuit,
56: fourth multiplication circuit,
57: first adder circuit,
58: second adder circuit,
59: control circuit,
61: phase estimation unit,
62: first phase compensation processing unit,
63: second phase compensation processing unit,
71: polarization rotation circuit,
72: phase compensation circuit,
73: spectrum calculation circuit,
74: spectrum selection circuit,
75: distance calculation processing circuit,
81: memory,
82: processor

What is claimed is:

1. An optical distance measurement device, comprising:
an optical output generator to output frequency-swept light whose frequency changes with lapse of time as reference light, to multiplex polarized waves of the frequency-swept light, and to output frequency-swept light of first and second polarized waves orthogonal to each other, said optical output generator including a laser light source and a multiplexer;
an optical receiver-transmitter to irradiate the frequency-swept light of first and second polarized waves toward a measurement target, and to receive frequency-swept light reflected by the measurement target as reflected light, said optical receiver-transmitter including a lens;
an optical interferometer to separate the reflected light into a reflected light of a first polarized wave and a reflected light of a second polarized wave, to extract first and second components orthogonal to each other from an interference light of the reflected light of the first polarized wave and the reference light, and to extract third and fourth components orthogonal to each other from an interference light of the reflected light of the second polarized wave and the reference light, said optical interferometer including an optical coupler and a polarization beam splitter; and
processing circuitry
to acquire one or more components of horizontal and vertical components of a polarized wave by rotating a polarization angle of a first complex signal having the first and second components and a polarization angle of a second complex signal having the third and fourth components; and
to calculate, on a basis of the acquired components, a difference between a frequency of the reflected light and a frequency of the reference light, and to calculate a distance to the measurement target from the difference.

2. The optical distance measurement device according to claim 1, wherein
the processing circuitry calculates, if a horizontal component is acquired, a frequency spectrum of the horizontal component, and if a vertical component is acquired, a frequency spectrum of the vertical component, and
calculates, on a basis of the calculated frequency spectrum, a difference between the frequency of the reflected light and the frequency of the reference light, and calculates, from the difference, the distance to the measurement target.

3. The optical distance measurement device according to claim 1, wherein
the processing circuitry acquires both the horizontal component and the vertical component,
calculates a frequency spectrum of the acquired horizontal component and calculates a frequency spectrum of the acquired vertical component,
selects one of the frequency spectrum of the horizontal component and the frequency spectrum of the vertical component, and
calculates a difference between a frequency of the reflected light and a frequency of the reference light on a basis of the selected frequency spectrum and calculates the distance to the measurement target from the difference.

4. The optical distance measurement device according to claim 1, wherein
the processing circuitry acquires both the horizontal component and the vertical component, constructs a complex signal from the acquired horizontal component and the acquired vertical component, performs phase compensation processing of removing a phase of a noise component contained in a phase of the complex signal, and outputs one or more components of the horizontal component and the vertical component in the complex signal after the phase compensation processing.

5. A machining device comprising: an optical distance measurement device that measures a distance to a measurement target; and a machining device to machine the measurement target on a basis of the distance measured by the optical distance measurement device, wherein
the optical distance measurement device includes
an optical output generator to output frequency-swept light whose frequency changes with lapse of time as reference light, to multiplex polarized waves of the frequency-swept light, and to output the frequency-swept light of first and second polarized waves orthogonal to each other, said optical output generator including a laser light source and a multiplexer,
an optical receiver-transmitter to irradiate the frequency-swept light of first and second polarized waves toward a measurement target, and to receive frequency-swept light reflected by the measurement target as reflected light, said optical receiver-transmitter including a lens,
an optical interferometer to separate the reflected light into a reflected light of a first polarized wave and a reflected light of a second polarized wave, extracting first and second components orthogonal to each other from an interference light of the reflected light of the first polarized wave and the reference light, and extracting third and fourth components orthogonal to each other from an interference light of the reflected light of the second polarized wave and the reference light, said optical interferometer including an optical coupler and a polarization beam splitter, and
processing circuitry
to acquire one or more components of horizontal and vertical components of a polarized wave by rotating a polarization angle of a first complex signal having the first and second components and a polarization angle of a second complex signal having the third and fourth components, and
to calculate, on a basis of the acquired components, a difference between a frequency of the reflected light and a frequency of the reference light, and to calculate a distance to the measurement target from the difference.

6. The machining device according to claim 5, further comprising an inspection device to inspect the optical distance measurement device on a basis of the distance measured by the optical distance measurement device.

* * * * *